Figure 1:
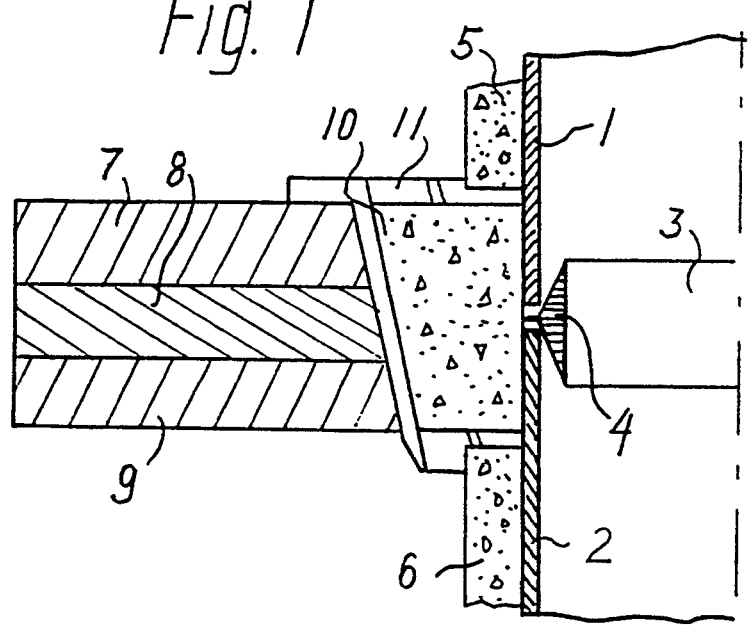

United States Patent [19]

Persson

[11] Patent Number: 5,370,298
[45] Date of Patent: Dec. 6, 1994

[54] METHOD FOR EXPLOSION WELDING OF JOINTS AND AN APPARATUS FOR JOINING TWO PIPES BY MEANS OF EXPLOSION WELDING

[75] Inventor: Tor Persson, Kristianstad, Sweden

[73] Assignee: International Technologies A/S, Oslo, Norway

[21] Appl. No.: 124,634

[22] Filed: Sep. 22, 1993

[51] Int. Cl.⁵ ............................................. B23K 20/08
[52] U.S. Cl. .................................. 228/107; 228/2.5
[58] Field of Search ............................... 228/107–109, 228/2.5; 29/421.1, 421.2

[56] References Cited

U.S. PATENT DOCUMENTS

| | | | |
|---|---|---|---|
| 4,641,775 | 2/1987 | Lande et al. | 228/107 |
| 4,746,150 | 5/1988 | Persson et al. | 228/2.5 |

FOREIGN PATENT DOCUMENTS

| | | | |
|---|---|---|---|
| 655943 | 11/1964 | Belgium | 228/2.5 |
| 952743 | 8/1974 | Canada | 228/2.5 |
| 1470379 | 4/1977 | Japan | 228/107 |
| 766741 | 1/1957 | United Kingdom | 228/2.5 |

*Primary Examiner*—Samuel M. Heinrich
*Attorney, Agent, or Firm*—Browdy and Neimark

[57] ABSTRACT

In explosion welding to join abutting pipes it is proposed that the external support comprise an annular member made of concrete or similar material.

11 Claims, 1 Drawing Sheet

METHOD FOR EXPLOSION WELDING OF JOINTS AND AN APPARATUS FOR JOINING TWO PIPES BY MEANS OF EXPLOSION WELDING

The invention relates to a method for joining abutting pipes by explosion welding, where there is placed inside the two pipes, positioned end-to-end, an explosive charge which is detonated, there first having been placed on the outside of the joint a support or restraining member surrounding or restraining the region of the joint.

It is proposed according to the invention that as an inner section of the support or restraining means there be provided an annular member made of concrete or similar material.

When the joint is explosively welded, this annular member will be crushed. It is therefore easily removed afterwards, and the remaining part of the support, i.e. the outer section, may be used over again. A particular advantage is that the support in this connection may be a unitary, annular member.

Concrete is a preferred material for said inner section. Other materials having similar properties with regard to crushing may also be used. For example, one could envisage the use of sand mixed with a cohesive material such as a suitable glue. Iron powder which has been compressed is also a possibility. What is important is that the material will form a cushion which decelerates the explosive force associated with plastic deformation and is destroyed, thus being more easily removable after the joint is welded.

The annular member advantageously may be provided by means of in situ casting. Here it may be advantageous first to place a sleeve around the joint prior to casting, and then to cast the annular member around this sleeve. The sleeve will form a barrier against the weld in the joint.

The outer section of the support may advantageously be used as a casting formwork.

The invention also relates to an apparatus for joining two pipes (1,2) by means of explosion welding, wherein the restraining means comprises a first support section mountable around the region of the joint, which in mounted state surrounds said joint region while being spaced radially therefrom, and another support section functioning as a filler element mountable in the annular space formed between the first support and the joint region, characterized in that the first support section, known per so, is made of a suitable metal or similar material, and the second support section is made of concrete or a similar crushable material.

The apparatus may advantageously be designed such that the two annular members have respective conforming internal and external conicity.

In addition, the apparatus may advantageously include an insert to be positioned between the two annular members section or for the purpose of clasping them together.

Furthermore, the apparatus may also be so constructed that the first support is formed by a plurality of superposed metal plates each having a respective bore in alignment with the other bores. This produces a particularly inexpensive embodiment of the first annular member, which is an element that is reusable in additional pipe joint welding operations using the explosion technique.

Figure 2:
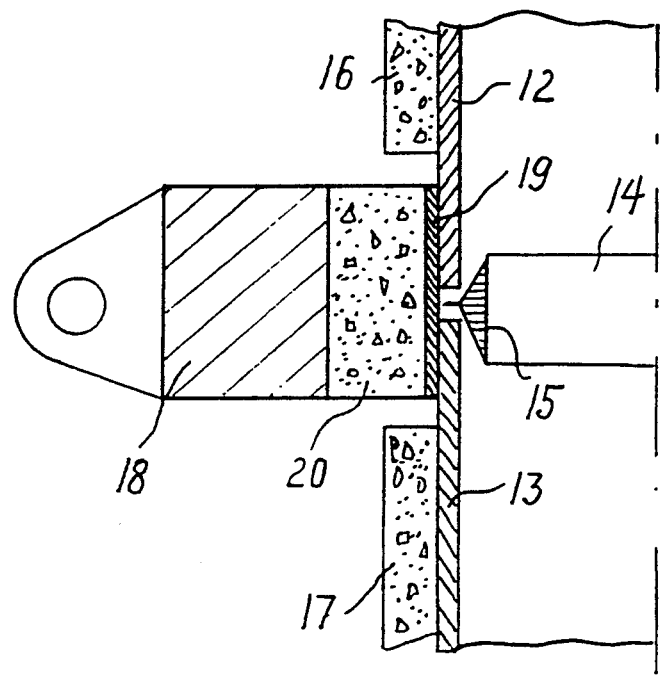

The invention will be explained in more detail with reference to the drawings, where FIGS. 1 and 2 show respective half sections of the region to be explosively welded.

In FIG. 1 are shown two pipes 1 and 2 that are positioned end-to-end for the welding of the joint by means of an explosive charge 3, utilizing an internal annular member 4, which will form a part of the pipe connection after the explosion of charge 3.

In the area where the two pipe ends are located, the protective coating 5,6 surrounding the pipes is excised, thus exposing the joint region.

On the outside of the joint region a necessary support is provided, here in the form of a outer section constructed of three heavy, superposed steel plates 7,8 and 9, each having a respective central bore, in alignment with the other bores, thus forming a through-going opening in which is placed a concrete member 10 as the inner section of the support. The bores are conical, as shown. Concrete member 10, inserted into the conical opening thus formed, has a complementary exterior conicity. Between concrete member 10 and steel plates 7,8,9 is positioned a suitable insert 11, which serves as a filler and clasping member.

When the explosive charge 3 is detonated, member 4 will be force-pressed against the ends of pipes 1 and 2. A joint is thereby formed between pipes 1 and 2. Concrete member 10 will be crushed and will crumble up, but it will provide sufficient support for the execution of the explosive welding of the joint.

Thus, on completion of the explosive weld, the pieces of the crumbled concrete member 10 will fall out of their own accord or, alternatively, may be easily removed. Steel plates 7,8,9 and insert 11 may, of course, be used over again.

Instead of concrete, the annular member may be made, for example, of sand mixed with a cohesive material. It is also possible to employ a powder technique utilizing other materials such as iron powder and the application of pressure to produce an annular member. The primary objective is to aim for production of a cushioning body that will decelerate the explosive force brought about through the plastic deformation of the pipes, and to be able to remove this cushioning body so that ample space is provided between the pipe—usually coated with concrete—and the remaining support surrounding it, which may then be removed without having to be opened.

In FIG. 2 is shown a second embodiment of the invention, with casting in situ of the crushable inner support.

Two pipes 12 and 13 are positioned end-to-end so that their joint may be welded with the aid of an explosive charge 14, utilizing an internal annular member 15, which will become a part of the pipe connection after the detonation of charge 14.

In the area where the two pipe ends are located, the protective coating 16,17 surrounding the pipes is excised, thus exposing the region of the joint.

On the outside of the joint region an outer support section is placed 18 around the two pipes. Against and around said two pipes is positioned a sleeve 19, e.g., in the form of a thin steel jacket. Using this sleeve 19 and support section 18 as components of a formwork, the inner support section 20 made of concrete or similar material may then be cast.

When charge 14 explodes, member 15 is pressed against the pipe ends, as described above. A welded joint is thereby provided between pipes 12 and 13. The cast member 20 will be crushed and will crumble up.

Having described my invention, I claim:

1. In a method for joining and abutting pipes by explosion welding comprising detonating an explosive charge at a joint location in the pipes where two pipes are positioned end-to-end, the improvement wherein the pipes are metal pipes having a coating on their outer surfaces, said coating being removed adjacent said joint, said improvement further comprising placing both an outer annular restraining member and an inner annular restraining member about said joint, said outer annular restraining member supporting said inner annular restraining member, and with said outer annular restraining member being spaced from said pipes and defining an annular space therebetween, said inner annular restraining member being formed of an explosion-crushable material and being located within said annular space which is open at both ends;

wherein, upon said detonation of said explosive charge effecting said explosion welding, said inner annular restraining member becomes crushed and crumbled, and at least a portion thereof falls away from said joint through at least one of the open ends of said annular space.

2. A method according to claim 1 wherein said explosion-crushable material is concrete.

3. A method according to claim 2 wherein said outer annular restraining member is placed about said joint and then said inner annular restraining member formed of concrete is cast in situ within said annular space.

4. A method according to claim 3 wherein, prior to said casting of said inner annular restraining member in situ, a sleeve is first placed around said joint, and said inner annular restraining member is cast about said sleeve.

5. In a method for joining two abutted pipes by explosion welding, where there is placed inside the two pipes, positioned end-to-end, an explosive charge that is detonated, there first having been placed on the outside of the joint a support surrounding the region of the joint, the improvement wherein said support comprises an outer section which is spaced from said joint so as to define an annular space therebetween, said method further comprising casting concrete in situ within said annular space.

6. An apparatus for joining two coated pipes by means of explosion welding, comprising an outer annular restraining member formed of metal for surrounding, at a radial distance, a joint area between the ends of the pipes which are to be explosion welded together, thus defining an annulus which is open at both ends, and an inner annular restraining member within said annulus and supported by said outer annular restraining member, said inner restraining member being formed of an explosion-crushable material.

7. An apparatus according to claim 6 wherein said explosion-crushable material from which said inner annular member is formed is concrete.

8. An apparatus according to claim 6 wherein an inner wall of said outer annular member is sloped in the axial direction to provide said outer annular member with internal conicity, and wherein an external wall of said inner annular member is complementarily shaped so as to provide said inner annular member with external conicity.

9. An apparatus according to claim 6 further comprising a metal sleeve for placement between said joint and said inner annular member.

10. In an apparatus for joining two pipes by means of explosion welding, comprising a support mountable around the region of the joint, the improvement wherein the support comprises a first annular member made of metal, dimensioned for receival of a second annular member made of an explosion-crushable material as a filler member between the first annular member and the two pipes to be explosively welded, and an insert to be positioned between the two annular members for clasping them together.

11. In an apparatus for joining two pipes by means of explosion welding, comprising a support mountable around the region of the joint, the improvement wherein the support comprises a first annular member made of metal, dimensioned for receival of a second annular member made of an explosion-crushable material as a filler member between the first annular member and the two pipes to be explosively welded, and said first annular member being formed from a plurality of superposed metal plates each having a respective bore in alignment with the other bores.

* * * * *